United States Patent
Kleiner (10) Patent No.: US 9,879,836 B2
(45) Date of Patent: Jan. 30, 2018

(54) LIGHTING DEVICE IN A MOTOR VEHICLE

(71) Applicant: Automotive Lighting Reutlingen GmbH, Reutlingen (DE)

(72) Inventor: Thomas Kleiner, Eningen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 95 days.

(21) Appl. No.: 14/490,197

(22) Filed: Sep. 18, 2014

(65) Prior Publication Data

US 2015/0078025 A1    Mar. 19, 2015

(30) Foreign Application Priority Data

Sep. 18, 2013  (DE) .................. 10 2013 218 739

(51) Int. Cl.
*F21S 8/10* (2006.01)
*B60Q 1/00* (2006.01)
(Continued)

(52) U.S. Cl.
CPC ........ *F21S 48/1241* (2013.01); *B60Q 1/0058* (2013.01); *B60Q 1/34* (2013.01); *F21S 48/215* (2013.01); *F21S 48/2237* (2013.01); *F21S 48/2268* (2013.01); *F21S 48/2287* (2013.01); *F21S 48/2293* (2013.01);
(Continued)

(58) Field of Classification Search
None
See application file for complete search history.

(56) References Cited

U.S. PATENT DOCUMENTS

2006/0083021 A1*  4/2006  Jeong ................ G02B 6/0021
                                                                    362/561
2006/0209524 A1   9/2006  Tenmyo
(Continued)

FOREIGN PATENT DOCUMENTS

DE  10 2005 021 079 A1   11/2006
DE  10 2007 005 183 A1    8/2008
(Continued)

OTHER PUBLICATIONS

English translation (machine) of EP 2500754 (Automotive Lighting), Sep. 19, 2012, all pages.*
(Continued)

*Primary Examiner* — Sharon Payne
(74) *Attorney, Agent, or Firm* — Howard & Howard Attorneys PLLC (57) ABSTRACT

The present invention is directed toward a lighting device in a motor vehicle that includes a first light conductor and at least one second light conductor. The first light conductor propagates light by total internal reflection which impacts on a light coupling-out area of light conductor and is at least partially reflected toward and emits from an opposite light output area. The at least one second light conductor propagates light by total internal reflection which is coupled into the first light conductor by a midway coupling-in. The light that emits out of the second light conductor via a light output area enters into the first light conductor via the light coupling-out area. An air gap is formed between the light coupling-out area of the first light conductor and the light output area of the second light conductor.

15 Claims, 7 Drawing Sheets

(51) Int. Cl.
*F21V 8/00* (2006.01)
*B60Q 1/34* (2006.01)

(52) U.S. Cl.
CPC .......... *G02B 6/001* (2013.01); *B60Q 2400/20* (2013.01); *B60Q 2400/30* (2013.01); *G02B 6/0076* (2013.01)

(56) References Cited

U.S. PATENT DOCUMENTS

| | | | |
|---|---|---|---|
| 2009/0185389 A1 | 7/2009 | Tessnow et al. | |
| 2013/0201708 A1* | 8/2013 | Takahashi | B60Q 1/0047 362/510 |
| 2013/0235608 A1* | 9/2013 | Tsai | G02B 6/0008 362/551 |
| 2013/0240037 A1* | 9/2013 | Yui | H01L 31/048 136/259 |
| 2014/0071703 A1* | 3/2014 | Motomura | F21S 48/00 362/511 |
| 2014/0078772 A1* | 3/2014 | Gaydoul | G02B 6/001 362/555 |

FOREIGN PATENT DOCUMENTS

| | | | |
|---|---|---|---|
| DE | 10 2007 023 076 A1 | 11/2008 | |
| DE | 10 2009 058 457 A1 | 6/2011 | |
| DE | 10 2010 006 348 A1 | 8/2011 | |
| DE | 10 2010 025 208 A1 | 12/2011 | |
| EP | 2 500 754 A1 | 9/2012 | |
| EP | 2 620 790 A1 | 7/2013 | |
| FR | 2930625 * | 2/2009 | ............... F21S 8/10 |
| WO | 2012/052946 A1 | 4/2012 | |

OTHER PUBLICATIONS

English machine translation of EP 2,620,790 A1 (Zizala in the Office Action), Jul. 31, 2013, all pages.*

Feb. 25, 2015 European Office Action for Application No. EP 14 18 2097.

Apr. 28, 2014 Examination Report for German Application No. 10 2013 218 739.4.

* cited by examiner

LIGHTING DEVICE IN A MOTOR VEHICLE

CROSS-REFERENCE TO RELATED APPLICATION

This application is based upon and claims priority to German Patent Application No. DE 1020132:18739.4 filed on Sep. 18, 2013.

BACKGROUND OF THE INVENTION

1. Field of the invention

The present invention relates, generally, to lighting devices and, more specifically, lighting device in a motor vehicle.

2. Description of the Related Art

Various lighting devices for motor vehicles are known in the art. Motor vehicle lighting devices may be differentiated between head lights and other types of lights. Head lights are located in the front area of a motor vehicle and promote road safety, by making the vehicle visible to other traffic participants, and serve to illuminate the roadway in front of the motor vehicle. Head lights may be realized as a low beam light, a high beam light, a fog light, or any other kind of adaptive light distribution suitable to improve the vision of the motor vehicle driver (for example, a positioning light, motorway light, partial high beam light, marker light, etc.). The other types of lights known in the art primarily promote road safety by making the vehicle visible to other traffic participants. By way of example, front lights in the front area of the motor vehicle may include daytime running lights, indicator lights, or positioning lights, and rear lights in the rear portion of the motor vehicle include brake lights, rear lights, reverse lights, or indicator lights. The front lights can be integrated into a head light or formed and arranged as separate lights in the front area of the motor vehicle. Moreover, one light may perform several light functions, such as is commonly integrated into one rear light.

Lighting devices known in the art include at least of one light source for producing light, (for example, a light bulb, gas discharge lamp or semiconductor light source), and at least one primary optics for focusing the produced light. The primary optics can be made in form of a reflector (concave mirror) which reflects the light by common reflection, or as a translucent body made of glass or plastic material (a so-called "optical lens") where the focusing of the light is achieved by optical refraction at the entry into the body and/or at the exit out of the body and/or by total internal reflection at the outer boundary surfaces of the body.

It is further common to use light conductors in lighting devices, where the entering light rays are propagated or transmitted by total internal reflection and are deflected via light coupling-out areas in such a way that they emit out of the light conductor at predefined light output areas. Thus, it is possible that the light—particularly in substantially rod-shaped light conductors—is coupled into the end faces of the light conductor. Further, it is also possible to couple light—additionally or alternatively—into an area along a longitudinal extension of the light conductor by a so-called "midway coupling-in". A coupling of light into the light conductor, which is not performed via the end faces of the light conductor, is generally called a midway coupling-in.

Light conductors are frequently made in form of a translucent body of glass or plastic material. The material of the light conductor can be stiff or flexible to a certain degree. The light conductors can be used in a lighting device in a similar way like a light source, whereby there is a considerable scope with regard to the shape and form of the light conductor itself and of the light output area of the light conductor. Thus, there is a great variety of characteristic design options for the lighting device in the use of light conductors.

The term "midway coupling-in" is to be understood as the coupling-in of light into a rod-shaped light conductor at a random location, but not at the end faces. Preferably, light is coupled into visible areas of the light conductor. A midway coupling-in into a light conductor is known, for example, from DE 102010025208A1, which depicts a lighting device that includes a first light conductor with a light input area, a light coupling-out area, and a light output area. A second light conductor is designed to couple light into the first light conductor by a midway coupling-in. In order to accomplish this, the second light conductor with its light output area is substantially aligned tangential to the light input area of the first light conductor. Thus, both light conductors are connected in a form-fit manner. In one embodiment, both light conductors of the light conductor arrangement are formed as a one-piece injection molding component. However, this is relatively complex and demands extensive planning, in particular to enable a demolding of the one-piece light conductor arrangement. The production of the light conductor arrangement can be complicated by undercuts. Yet, it is also possible to produce the two light conductors separately.

The disadvantage of the lighting device with the common light conductor arrangement arises when the light conductor arrangement is made in several parts, which means that the light conductors are made separate from each other and the junction between the light conductors presents an interference point where light is coupled out of the light conductor in an undesired way. As a result, the efficiency or efficiency factor of the light conductor arrangement is reduced. Further, to an observer, the light emitted from the interference point in an uncontrolled way produces an inhomogeneous appearance of the light conductor arrangement. Further, in the cold condition, the junction is clearly visible as a dark area and creates an optically unpleasant, inhomogeneous appearance of the light conductor.

Thus, there remains a need in the art for a light conductor arrangement that includes at least two light conductors, where one of the light conductors couples light into the other light conductor by a midway coupling-in in a simple and cost-effective way, where the light conductors can be connected with each other in such a way that light from the one light conductor is efficiently coupled into the other light conductor.

SUMMARY OF THE INVENTION

The present invention overcomes the disadvantages in a lighting device in a motor vehicle that includes a first light conductor and at least one second light conductor. The first light conductor is used to propagate light by total internal reflection along a longitudinal extension of the first light conductor, whereby a longitudinal extension is by far greater than a transverse width. The light conductor includes a light coupling-out area that extends over a section of the longitudinal extension, which reflects incident light onto a light output area of the first light conductor that is substantially located opposite of it. The second light conductor is used to propagate light by total internal reflection along a longitudinal extension of the second light conductor, whereby the second light conductor includes a light output area, by which at least part of the light emits out of the at least one second light conductor. The second light conductor and the first light conductor are arranged towards each other in such a way that light of the second light conductor enters into the first light conductor via a midway coupling-in.

It is suggested that the light that is emitting from the at least one second light conductor enters into the first light conductor via the light coupling-out area of the first light conductor, and that an air gap is formed between the light output area of the at least one second light conductor and the light coupling-out area of the first light conductor. Hereby it is preferred that coupling-out elements are arranged on the light output area of the second light conductor.

It is known that the light conductors include total internal reflective characteristics. A total internal reflection occurs at a boundary surface between two mediums with a different optical density. The light is totally reflected at the boundary surface when the angle of incidence or the angle of impact of the light falls below a certain critical angle with respect to the boundary surface. The critical angle depends on the chosen material of the two mediums that are joining at the boundary surface, respectively.

According to the invention, the air gap between the light output area of the at least one second light conductor and the light coupling-out area of the first light conductor prevents interference points between the light conductors—as they occur in the prior art. In this way, the transition between the first light conductor and the at least one second light conductor is not visible, neither in the switched-off state, nor in the switched-on state. A particularly homogeneous appearance is achieve in the switched-on state, when the luminous flux of the light that is fed into the first light conductor via the at least one second light conductor is low in comparison to the luminous flux of the light that is conducted in the first light conductor. In this way, there is no interference to the appearance of the first light conductor by the light that is coupled-in via the at least one second light conductor.

The first light conductor and the at least one second light conductor are separate parts, which can be produced without any difficulties. Undercuts can be avoided by individual production. In the built-in state, the at least one second light conductor is held in its relative position to the first light conductor, for example with a mechanical provision. One mechanical provision for holding both light conductors relative to each other can be intended, such as a frame that contains the at least one second light conductor and has an opening at the light coupling-in area and at the light coupling-out area of the second light conductor. The function of the frame is to hold the second light conductor in its position. Further, the second light conductor can be attached with snap-on pins and/or fastening clips, whereby the first light conductor is positioned at the light coupling-out area of the at least one second light conductor, and the first light conductor is pressed onto the second light conductor with a side fin or a fastening clip that is attached to the first light conductor so that the mutually complementary prisms on the first and second light conductor interlock. The first light conductor may be housed in a rail-shaped U-profile or a similar profile that include an opening at the location where the second light conductor is positioned. The first light conductor may be mounted by snap-on pins and/or fastening clips. There is an air gap between the complementary prisms of the first and second light conductor due to the tolerances coming from the production, which cannot be avoided. Additionally, the air gap can be ensured with intentionally added elevations into the prism valleys and/or the prism tips of the first and/or second light conductor.

In the lighting device according to the invention, the light emitted from the at least one second light conductor enters into the first light conductor via the light coupling-out area of the first light conductor. Thus, the light coupling-out area of the first light conductor not only directs light rays propagated in the first light conductor onto the light output area in this section, but simultaneously forms a light input area for the first light conductor.

In one embodiment, the light output area of the at least one second light conductor includes a structure that is complementary to a structure of the light coupling-out area of the first light conductor. The structure ensures that light from the at least one second light conductor can enter into the first light conductor. For this reason, the structure could feature at least in some sections a steep light input area relative to the incident light, which is steep enough so that the angle of impact of the light from the at least one second light conductor surpasses the critical angle for the total internal reflection, in order to prevent the total reflection in this case and to ensure the entry of the light into the first light conductor. The light enters substantially unhindered into the first light conductor, despite some possible refraction effect.

The structure also allows light that is propagated within the first light conductor has to be coupled-out at the structure of the first light conductor (which means it has to be deflected into the direction of the light output area), so that light emits out of the first light conductor at the light output area, and thus emits out of the entire light conductor arrangement. To accomplish this, the structure could feature a low inclined light coupling-out area relative to the incident light at least in some sections, which is low enough so that the angle of impact of the light is below the critical angle for the total internal reflection, in order to deflect light in this case by total internal reflection onto the light output area.

Thus, the light coupling-out area of the first light conductor may include a prism structure. It is particularly preferred that the prism structure be formed in a triangular, in particular in a saw-tooth shape, within a longitudinal section of the first light conductor which is extending in longitudinal direction. A row of prisms in longitudinal direction of the first light conductor is preferably intended. In contrast to the prior art, it is also possible that several rows of prisms could be arranged next to each other in longitudinal direction of the first light conductor, whereby each row of prisms runs vertical to the longitudinal extension of the first light conductor. The individual rows of prisms can be formed in a different way. Particularly advantageous is a saw-tooth shaped prism structure. A saw-tooth generally includes two differently steep flanks, which can be arranged in such an angle, that one flank is sufficiently steep, so that the light from the at least one second light conductor can enter and the other flank is sufficiently flat in order to totally reflect the light that is propagated in the first light conductor.

It is also possible for the first light conductor to include several rows of prisms at the coupling-out area, which are arranged next to each other in longitudinal extension, running parallel towards each other, whereby the rows of prisms run perpendicular to the longitudinal extension of the first light conductor, whereby two or several second light conductors can be arranged next to each other at the first light conductor. The entry of light into the first light conductor occurs according to the same principle (with an air gap), as in the case when only one second light conductor would couple light into the first light conductor. The advantage of arranging several second light conductors to the first light conductor and of the possible coupling-in of light from several second light conductors is, that the luminous flux of the light that is coupled-in via one single second light conductor is relatively low, ensuring that the luminous flux of the propagated light within the first light conductor is by far higher than the luminous flux of the light that is coupled-in via a second light conductor. Thus, a particularly homogeneous appearance of the light conductor arrangement can be accomplished in the switched-on state.

Further, individual rows of prisms may feature different prism structures so as to produce different coupling-out directions of the light, if necessary, such that the light emits into different directions of the first light conductor.

In one embodiment, the first light conductor is substantially rod-shaped and includes a light input area at least on one end face. In order to accomplish a midway coupling-in, the at least one second light conductor can close in tangentially to the first light conductor in the course of its longitudinal extension, in order to amplify the light propagated from the end faces into the first light conductor with additional light.

In the light conductor arrangement, the first light conductor can also be designed in a curved shape. Moreover, the first light conductor can be curved to such an extent that it forms a ring-shape. Similarly, the first light conductor can be designed as a closed light conductor ring. A ring-shaped light output area can thus be created for the light that is emitting from the light conductor arrangement.

Because the first light conductor represents the light output area of the light conductor arrangement and the shape of the light output area is determined by the shape of the first light conductor, it is possible to design the shape of the light output area in almost any desired way in both longitudinal and transverse extension, which can be characterizing for the design of the entire lighting device that is visible from the outside.

In one embodiment, the at least one second light conductor is designed curved or straight and includes a light input area at one end face. The shape of the at least one second light conductor plays a subordinate role in the design of the light conductor arrangement visible from the outside, so that the embodiment of the at least one second light conductor can be adapted to the constructional and technical conditions in the motor vehicle. The second light conductor preferably follows the course of the first light conductor, at least to a certain extent, in order to be able to couple light into it by a midway coupling-in.

At least one respective light source may be assigned to the light input area on the end face of the first light conductor and to the light input area on the end face of the at least one second light conductor, which can emit light in various colors. For example, a white light source (such as a white light emitting diode) may be assigned to the light input area of the first light conductor, and a yellow light source (such as a yellow light emitting diode) may be assigned to the light input area of the at least one second light conductor. In this way, and by way of non-limiting example, it is possible to produce a daytime running light or a positioning light with the light conductor arrangement, where the white light source, assigned to the first light conductor, is switched on. By switching on the yellow light source, which is assigned to the at least one second light conductor, the same light conductor arrangement can be used to produce an indicator light. During the operation of the indicator light, it is possible to alternately emit yellow light (indicator light) and white light (daytime running light or positioning light) from the first light conductor. During the operation of the indicator light of the light conductor arrangement, the white light source, which is assigned to the first light conductor, can be dimmed. It will be appreciated that it is possible to assign several light sources to each light input area so as to amplify luminous flux. It is additionally possible to combine yellow, red, and/or white light within the light conductor arrangement in order to implement a rear light. The advantage of the embodiment with several light sources of different colors is that one single light output area can be used to accomplish various light functions.

The light from the at least one second light conductor can further be used to boost the light in the first light conductor. Particularly long first light conductors display a noticeable color shift along their longitudinal extension, which can reach an undesired color, possibly even as far as to not meet government-mandated regulations. This effect can be avoided with the additional input of light from the at least one second light conductor. Thus, with the at least one second light conductor, it is not only possible to increase the brightness of the light that is propagated within the first light conductor and that is emitted via its light output areas or to maintain it on a constant level, but it is also possible to maintain the light color on an consistent level.

The lighting device according to the invention is preferably designed to produce at least one light function. The above-mentioned example refers to the implementation of light functions in the front area of a motor vehicle. However, it will be appreciated that it is likewise possible to implement and combine light functions in the rear area. Thus, it is possible to assign a white light source to the first light conductor for producing a reverse light; and a yellow light source for producing an indicator light, and/or a red light source for producing a rear light can be assigned to the at least one second light conductor. A combination of rear lights and brake lights are possible as well, whereby all light sources could be red.

Furthermore, at least two respective light sources could be assigned to the light input area on the end face of the first light conductor and/or the light input area on the end face of the at least one second light conductor, which emit light in different colors. In this way, it is possible to assign a white light source as well as a yellow light source to the first light conductor, as well as to the at least one second light conductor at their respective light input areas. In operation, the light source of the at least one second light conductor can support the respective function of the first light conductor by activating the light source with the same color. An animated switching on-and-off of the daytime running light or of the positioning light is also possible by deliberate temporary adding of light of a different light color than what is needed for the light function.

In one embodiment, the lighting device may include several second light conductors, whereby the light output areas of the second light conductors are arranged in succession along the longitudinal extension of the first light conductor. For example, if the light from the second light conductor serves to produce an indicator light, then a yellow light source can be assigned to each second light conductor. With successive arrangement of the light output areas of the second light conductors, it is possible to implement a so-called "sweeping" turn signal, whereby the light sources of the successively arranged second light conductors are switched on sequentially one after the other, so that a wandering indicator information is accomplished which is preferably moving towards the turning direction. Such indicator information is easily to be interpreted by other traffic participants and increases the overall traffic safety.

In one embodiment, a cross-sectional area of the at least one second light conductor, in particular in the section of the light output area, becomes smaller with growing distance to the light input area when viewed in transverse direction to the longitudinal extension of the at least one second light conductor. This increases the efficiency of the light entering from the at least one second light conductor into the first light conductor because as much light as possible can be transmitted from the at least one second light conductor into the first light conductor.

BRIEF DESCRIPTION OF THE DRAWINGS

Other objects, includes, and advantages of the present invention will be readily appreciated as the same becomes better understood after reading the subsequent description taken in connection with the accompanying drawing wherein.

DETAILED DESCRIPTION OF THE INVENTION

Figure 1:
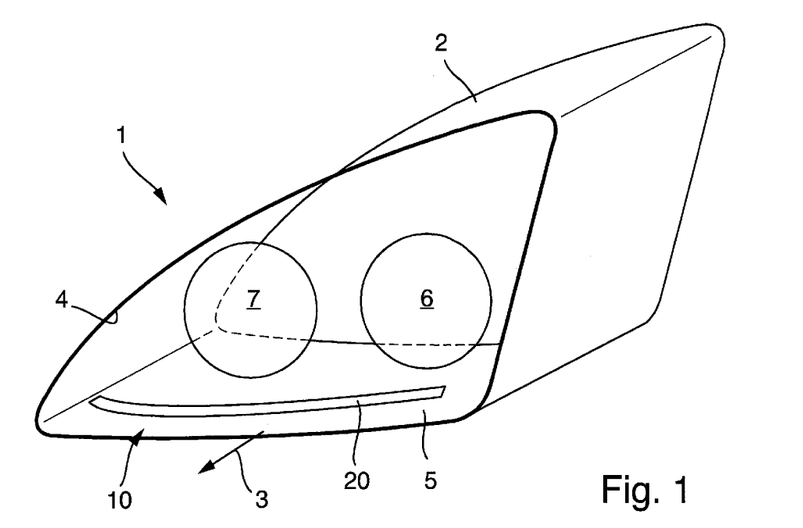
FIG. 1 shows a lighting device in a motor vehicle in a schematic depiction.

With reference now to the drawings, FIG. 1 shows a lighting device 1 in a motor vehicle according to the invention in a schematic depiction, which is formed as a head light by way of an example. The lighting device includes a head light housing 2, which is preferably made of plastic material. The head light housing 2 includes a light aperture 4 in one light emitting direction 3, which is covered by a translucent cover screen 5 in order to prevent dust, dirt, or moisture from entering into the inside of lighting device 1. The cover screen 5 is made of plastic material or glass and can be a plain screen, without any optically active elements, or a diffuser lens, with optically active elements such as cylindrical lenses or prisms.

Two light modules 6 and 7 are arranged on the inside of lighting device 1. The light module 6 can produce a low beam light, which can be switched to produce a high beam light according to the well-known method, and the light module 7 can be used to produce a fog light.

Furthermore, a light conductor arrangement 10 is arranged in the housing 2 of the lighting equipment 1, which has a far longer longitudinal extension compared to transverse width. A light output area 20 of the light conductor arrangement 10 faces into the light emitting direction 3. The light conductor arrangement 10 is preferably used to produce at least one light function, such as a daytime running light, an indicator light, a positioning light, a side marker light and/or any other light function.

The lighting device 1 according to the invention could also be arranged in the rear area of a motor vehicle. In this case, the light modules 6 and 7 can be omitted, so that the lighting device 1 is used to produce light functions such as a rear light, a brake light, a reverse light, or an indicator light. The respective light functions are preferably produced by the light conductor arrangement 10. The lighting device 1 according to the invention could also include several light conductor arrangements 10, which could be designed differently.

Figure 2:
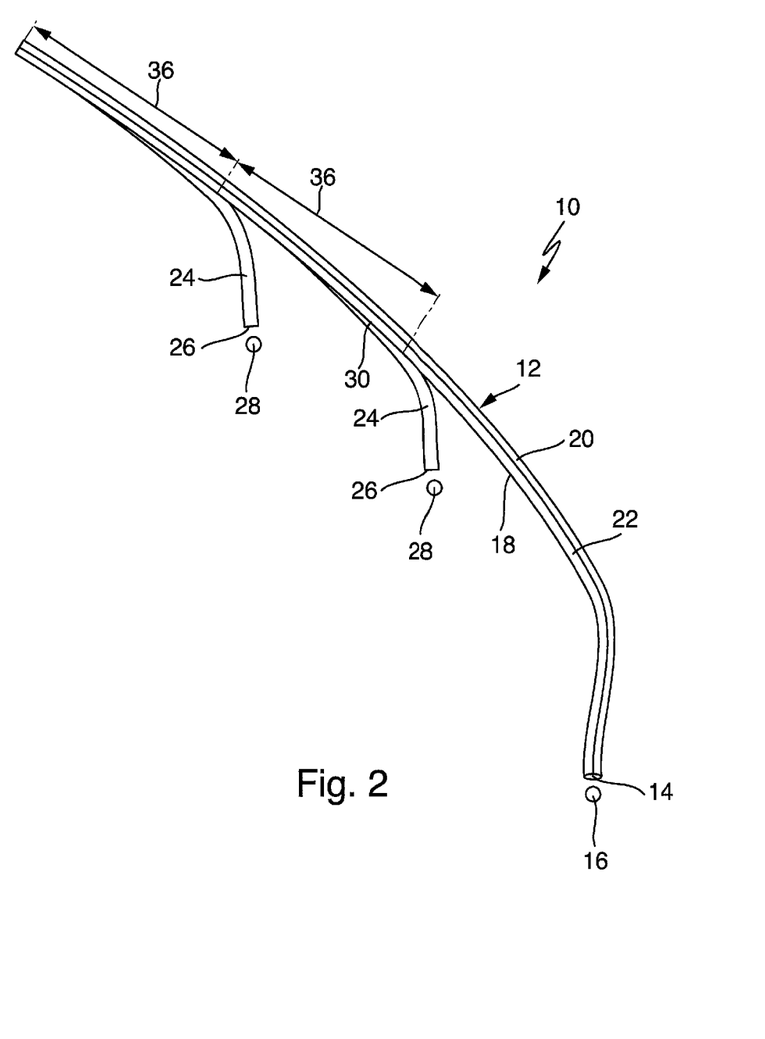
FIG. 2 shows a perspective view of a light conductor arrangement of a lighting device in a motor vehicle.

FIG. 2 shows the light conductor arrangement 10 of the lighting device 1 in a perspective view. The light conductor arrangement 10 is preferably used to produce light functions in the front and/or rear area of the motor vehicle.

Figure 3:
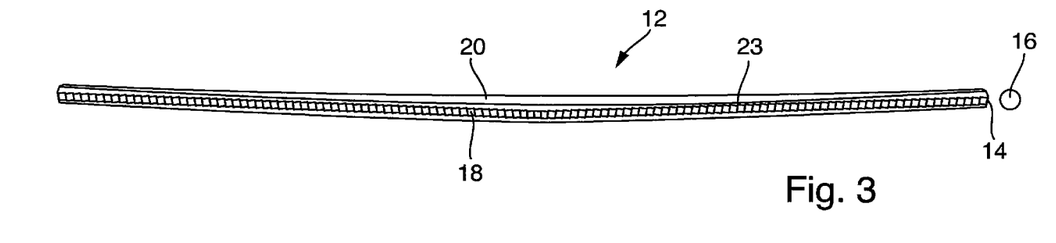
FIG. 3 shows a first light conductor of the light conductor arrangement of FIG. 1 in a first embodiment in detail.

The light conductor arrangement 10 includes a first light conductor 12, which is designed in a mainly curved shape. It could also be designed in a rod-shaped or ring-shaped form or also as a closed ring. FIG. 3 depicts the first light conductor 12 in detail. The first light conductor 12 includes a longitudinal extension, which is by far greater than its transverse width, and is preferably made of glass of translucent plastic material. The first light conductor 12 includes total internal reflection characteristics.

The first light conductor 12 includes a first light input area 14, which is located on at least one end face of the first light conductor 12. At least one light source 16 is arranged in front of the light input area 14. The emitted light of light source 16 is preferably focused and directed into the direction of the light input area 14, such as by corresponding optics. Further, the light conductor 12 includes a light coupling-out area 18, which deflects the light propagated within the first light conductor 12 into the direction of the light output area 20 by total internal reflection. To that end, the light coupling-out area 18 includes a prism structure 22, in particular a sawtooth shaped structure (see FIGS. 5 and 6). The prism structure 22 runs in one row of prisms, along the longitudinal extension of the first light conductor 12. In FIG. 3, the light coupling-out area 18 stretches over the entire longitudinal extension of the first light conductor 12. Yet, it is also possible that there are no light coupling-out areas 18 at least in the end regions of the first light conductor 12 (towards the end faces). The light output area 20 transmits light rays that have impacted on the light coupling-out area 18 before, whereby the light rays traverse the light conductor 12 after impacting on the light coupling-out area 18 and before exiting the light conductor 12 via the light output area 20. Other light rays should also be totally reflected on the boundary surfaces 23 within the region of the light output area 20.

Figure 4:
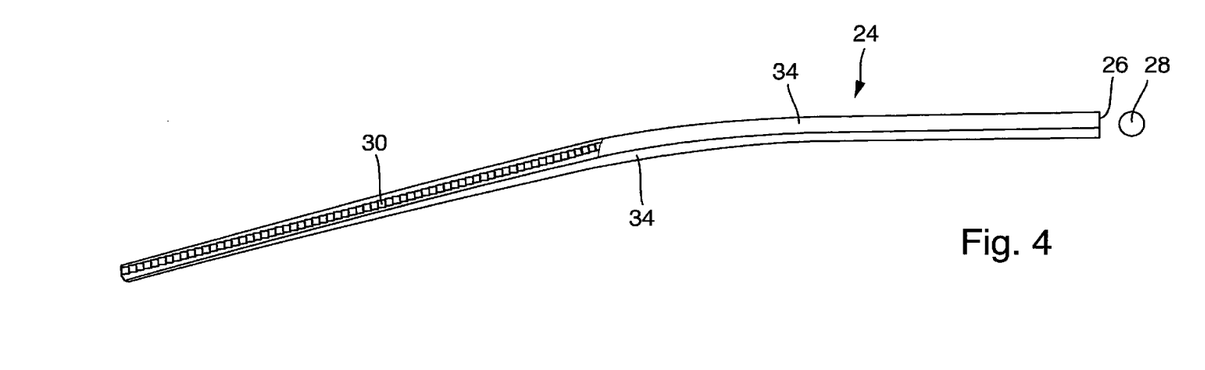
FIG. 4 shows a second light conductor of the light conductor arrangement of FIG. 1 in detail.

In the embodiment of FIG. 2, the light conductor arrangement 10 includes two second light conductors 24, which close in tangentially onto the first light conductor 12 in the region of the light coupling-out area 18 of the first light conductor 12. FIG. 4 depicts the second light conductor 24 in detail. The second light conductor 24 is designed in a mainly curved shape. The second light conductor 24 is preferably made of glass or translucent plastic material and includes total internal reflection characteristics.

The second light conductor 24 includes a light input area 26, which is allocated on at least one end face of the second light conductor 24. A light source 28 is arranged in front of the at least one light input area 26. The light emitted from light source 16 is preferably focused and directed into the direction of the light input area 26, such as by corresponding optics.

Figure 5:
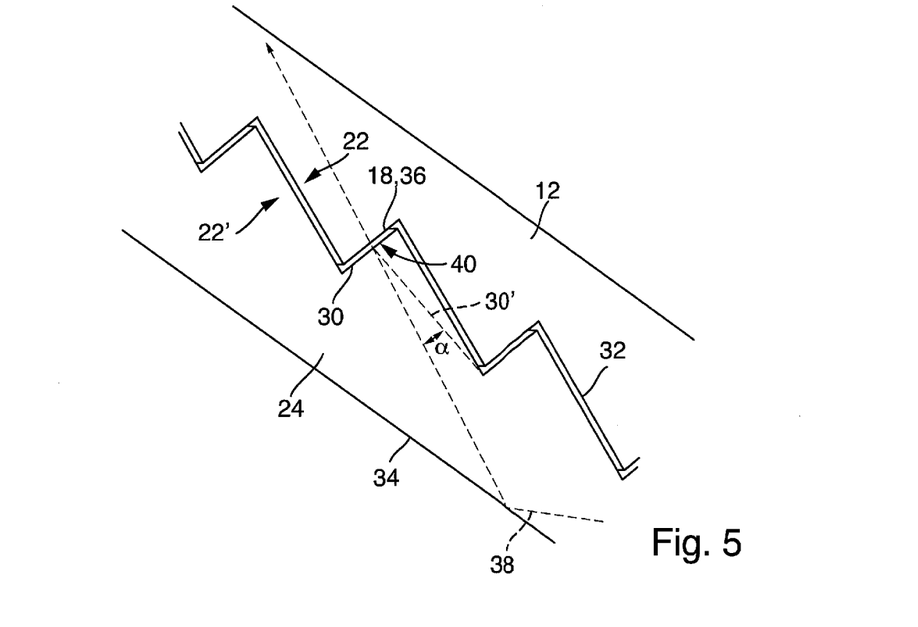
FIG. 5 shows a section between the first and the second light conductor with a depiction of light entering from the second light conductor into the first light conductor.

In addition to this, the second light conductor 24 also includes a the light output area 30, which includes a prism structure 22', in particular a saw-tooth shaped structure (see FIG. 5). On the one hand, the prism structure 22' represents coupling-out elements, where light can directly exit the light conductor 24. This is different from the first light conductor 12, where light is reflected at the coupling-out elements 22 of the coupling-out area 18 and then exits the light conductor 12 via the output area 20 on the opposite side. The prism structure 22' that is formed on the output area 30 of the second light conductor 24 runs in one row of prisms along the longitudinal extension of the light conductor 24. Preferably, the light output area 30 only runs along a partial section of the longitudinal extension of the second light conductor 24. The saw-tooth shaped structure 22' of the light output area 30 of the second light conductor 24 is shaped in a complementary way with regards to the light coupling-out area 18 of the first light conductor 12. An air gap 32 is formed between the light output area 30 of the second light conductor 24 and the light coupling-out area 18 of the first light conductor 12 (see FIG. 5). In the mounted state, the light conductor 24 has to be held in its position relative to the first light conductor 12, such as with a mechanical provision. A suitable mechanical provision can be used for this purpose, such as a frame, snap-on pins, and/or fastening clips, which would position and hold the second light conductor 24 relative to the first light conductor 12. The first light conductor 12 can be housed or held with a rail-shaped U-profile or a similar profile.

Thus, light can enter into the first light conductor 12 via the air gap 32 and via the light coupling-out area 18 by a midway coupling-in within the region of the light coupling-out area 30. Thus, the light coupling-out area 18 of the first light conductor 12 represents a further light input area 36 for the first light conductor in the region of the light output area 30 of the second light conductor 24, which is located opposite of it and which is arranged along the longitudinal extension of the first light conductor 12.

Apart from the light output area 30 and light input area 26, the remaining areas of the second light conductor 24 are boundary surfaces 34, where the light that is propagated within the second light conductor 12 can be transmitted by total internal reflection.

Figures 7, 8:
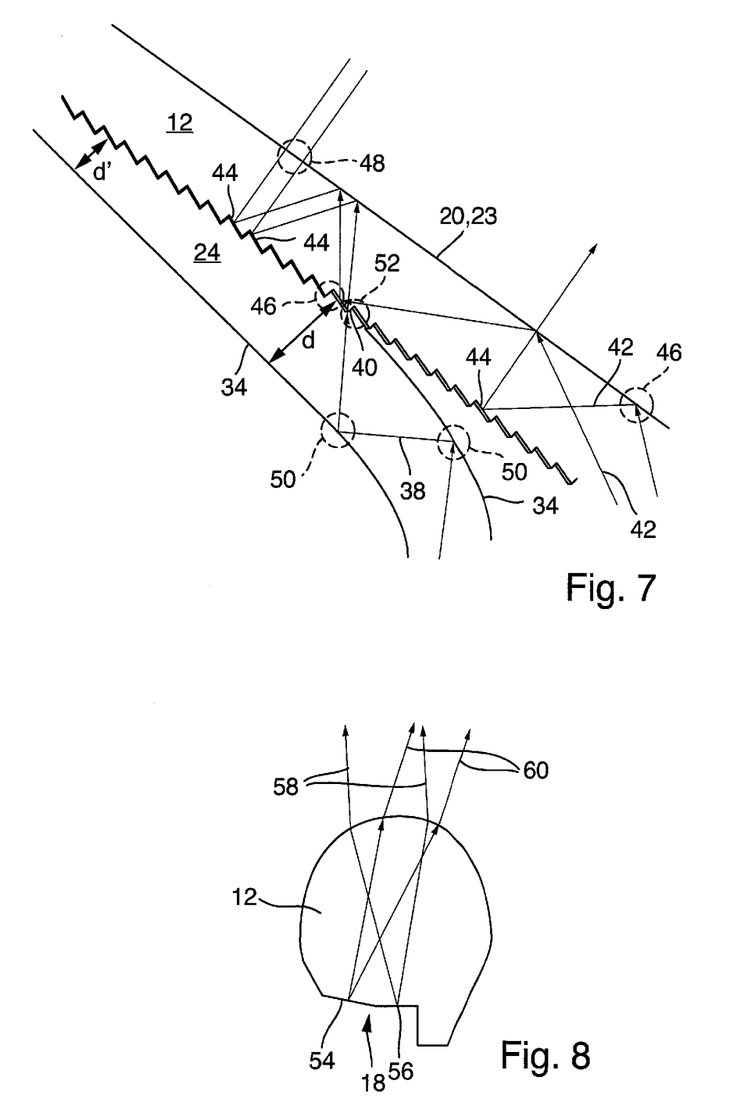
FIG. 7 shows possible paths of the light beams in the first and in the second light conductor.
FIG. 8 shows the first light conductor of the light conductor arrangement from FIG. 1 in a second embodiment in cross section.

The second light conductor 24 is preferably designed in such a way that a cross-sectional area (stretching perpendicular to its longitudinal extension) reduces with growing distance to the light input area 26, in particular in the region of the light output area 30 (see d and d' in FIG. 7).

The working method of the light conductor arrangement 10 will be explained with reference to FIGS. 5-7. According to the invention, the light coupling-out area 18 of the first light conductor 12 has the additional function of a further light input area 36 in the region of the light output area 30 of the second light conductor 24, which is located opposite of it.

Generally, total internal reflection occurs at a boundary surface between two mediums with a different optical density. Here, at the boundary from the optically more dense towards the optically less dense medium, light is totally reflected when an angle of incidence α (or the angle of impact of a light ray that is measured in relation to the surface normal of the boundary surface) surpasses a certain critical angle in relation to the normal of the boundary surface. The critical angle is dependent on the respectively chosen material of the two mediums that are joined together at the boundary surface.

In the lighting device 1 according to the invention, the boundary surface of the second light conductor 24 is formed by the light output area 30. The surface normal is described with the reference sign 30' in FIG. 5. The light coupling-in from the second light conductor 24 into the first light conductor 12 is shown best in FIG. 5. A light ray 38 that is propagated within the second light conductor 24 impacts on the flank 40 of the saw-tooth structure 22, which forms the light output area 30. The light ray 38 impacts on the flank 40 at such a steep angle (angle of impact α of the light ray 38 is below a critical angle for a possible total internal reflection), that it exits out of the second light conductor 24 instead of being totally reflected internally. The light ray 38 exits out of the second light conductor 24, traverses through air gap 32, and then enters substantially unhindered (apart from some possible refraction effects) into the first light conductor 12 via the light input area 36.

Figure 6:
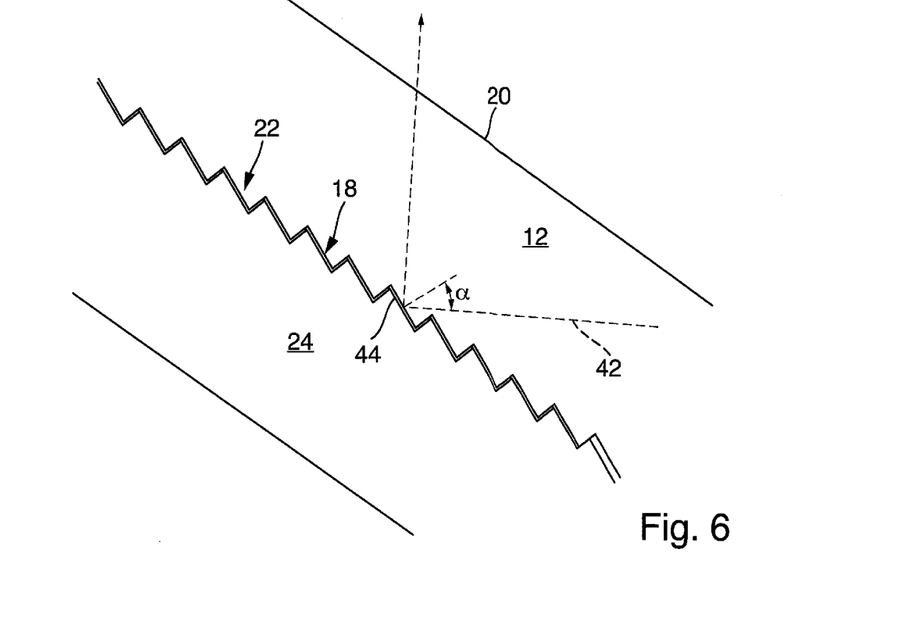
FIG. 6 shows the section between the first and the second light conductor with a depiction of a total internal reflection of the light that is propagated within the first light conductor.

The coupling-out of light from the first light conductor 12 by the light coupling-out area 18 is best shown in FIG. 6. A the light ray 42 that propagates within the first light conductor 12 impacts on a flank 44 of the saw-tooth structure 22 in such a low angle (with such a high angle of impact α), that the light ray 42 is totally reflected at the light coupling-out area 18 into the direction of the light output area 20.

Several possible paths of light beams within the light conductor arrangement 10 are depicted in a summarized way in FIG. 7. The light ray 42 is a light ray that is propagated within the light conductor 12. The light ray 42 is reflected at boundary surface 23 or at the light coupling-out area 18 (in the region that is described with reference sign 46), since the angle of impact α is small (the angle of impact α is bigger than the critical angle for a total internal reflection). The light coupling-out area 18 is designed in such a way that the light propagated within the light conductor 12 can only impact on the flatly aligned flanks 44 of the saw-tooth structure 22. In this way, the light rays 42 only impact on boundary surface 23 or on the light coupling-out area 18 in a relatively small angle (with a relatively high angle of impact α) and are thus totally reflected. When the light rays 42 impact on the surfaces 18; 23 in a sufficiently steep angle (with a relatively small angle of impact α, they will exit out of the light conductor 12 (in the region that is described with reference sign 48).

At first, if the light ray 38 is propagated within the second light conductor 24, the light ray 38 is reflected (in the region described with reference sign 50) when it impacts on boundary surface 34 with a small angle (angle of impact α is greater than the critical angle for a total internal reflection). In its further course, the light ray 38 may impact on the steeply aligned flank 40 of the saw-tooth structure 22' of the second light conductor 24. Here, the critical angle for a total internal reflection is not reached, so that the light exits out of the second light conductor 24, traverses through the air gap 32, and then enters into the first light conductor 12 (in the region described with reference sign 52). Subsequently, the light ray 38 is further propagated within the first light conductor 12, as if it would have entered the first light conductor 12 from the start. Thus, the second light conductor 24 presents a light supply into the first light conductor 12 between the boundaries of the arranged region of the light conductor 12. The light of the second light conductor 24 can further be used to boost the light in the first light conductor 12, in particular with regards to the color.

In order to produce different light functions, the light conductor arrangement 10 can emit light in different colors. In order to accomplish this, it is intended that one respective light source 16 or 28 is assigned to the light input area 14 of the first light conductor 12 and to the light input area 26 of the second light conductor 24, which emit light in a different color. Thus a white light source 16 (preferably a white light emitting diode) may be assigned to the light input area 14 of the first light conductor 12, and a yellow light source 28 (preferably a yellow light emitting diode) may be assigned to light input area 26 of the second light conductor 24. It is thus possible to produce a daytime running light or a positioning light in the lighting device 1 by switching on the first light source 16, which is assigned to the first light conductor 12. By switching on the yellow light source 28, which is assigned to the second light conductor 24, it is possible to produce an indicator light with the same the light conductor arrangement 10. In order to amplify the luminous flux, it is also possible to assign several light sources 16 and/or 28 to each light input area 14 or 26, which emit light in the same color.

The above-mentioned combinations of white and yellow light sources in the front area of the motor vehicle only serve as an example. The light conductor arrangement 10 can be applied in lighting devices 1 in the front and/or rear area of a motor vehicle. Thus, a variety of combinations of light functions can also be implemented for the rear area, such as a combination of reverse light and indicator light, or rear light and brake light, or reverse light and rear light. It is also possible to implement more than two light functions in the lighting device 1, since the amount of second light conductors 24 that can be connected to the first light conductor 12 is not limited. Each second light conductor 24 can couple-in light of a certain intensity and color into the first light conductor 12, so that the light emitted by the first light conductor 12 can produce corresponding light functions. A light function of the first light conductor 12 is either produced by the light from one or from several second light conductors 24. Light can additionally be coupled into at least one end of the first light conductor 10, which can be used to produce the light function. The respective luminosity and light color of a light function can be set according to government-mandated regulations.

However, when required, the second light conductor 24 can also boost the luminosity of the light produced within the first light conductor 12. Thus, the first light conductor 12 can produce a red rear light. By switching on a red light source 28 of the second light conductor 24, which provides additional light, a brake light can be produced when required.

Further, it is also possible that more than one light emitting diode could be assigned to at least one light input area 14 and 26, whereby the individual light emitting diodes at the light input areas 14 and/or 26 emit light in different colors.

The light conductor arrangement 10 can include several second light conductors 24 (see FIG. 2), which are arranged in succession along the longitudinal extension of the first light conductor 12. If the light of the second light conductor 24 is used to produce an indicator light, a yellow light source 28 can be assigned to each second the light conductor 24. With successive arrangement of the light output areas 30 of the second light conductor 24, it is possible to implement a so-called "sweeping" turn signal, whereby the light sources 28 of the successively arranged second light conductors 24 are switched on sequentially one after the other so that a wandering indicator information is accomplished which is preferably moving towards the turning direction.

FIG. 8 depicts the first light conductor 12 of the light conductor arrangement 10 in a second, alternative embodiment in cross-section. Here, the first light conductor 12 includes two rows of prisms 54, 56 at the coupling-out area 18, which run parallel towards each other in longitudinal extension of the first light conductor 12. A respective second light conductor 24 can be arranged with respect to the rows of prisms 54, 56, whereby the structure of the light output area 30 of the second light conductor 24 is formed in such a way that it is complementary to the respective row of prisms 54, 56 of the first light conductor. The second light conductor 24 is also arranged in such a way that the air gap 32 is formed between the light output area 30 of the second light conductor 24 and the light coupling-out area 18 of the first light conductor. In this way, it is possible to arrange two or more second light conductors 24 to the first light conductor 12 which are parallel to each other. The light entry into the first light conductor 12 occurs in the same way, as if only one row of prisms is formed (as depicted in FIGS. 2 to 7). It is thus possible that the individual rows of prisms 54, 56 may include a different respective prism structure and, thus, produce different coupling-out directions 58, 60.

Figure 9:
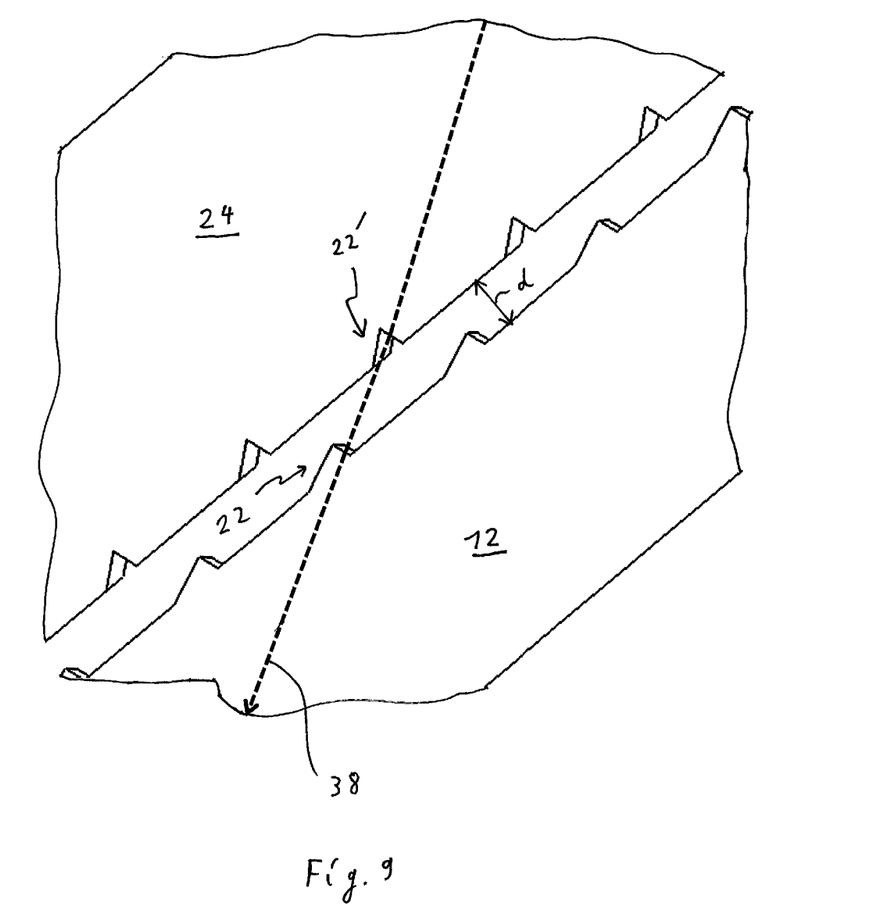
FIG. 9 shows an embodiment of a light conductor arrangement with prism structures that are made of deepenings and elevations.

FIG. 9 depicts an arrangement that is comparable to the arrangement according to FIG. 5, which is made of a first light conductor 12 and a second light conductor 24.

The second light conductor 24 includes prism structures 22' which are made in form of deepenings within a boundary surface of the second light conductor. The first light conductor 12 includes prism structures 22 which rise out of a boundary surface of the first light conductor and which are thus elevated prism structures 22.

In one embodiment of the invention, the first light conductor 12 and the second light conductor 24 are arranged in such a way that the boundary surface of the second light conductor 24, which includes the prism structures 22' that are created by deepenings, is allocated opposite to the boundary surface of the first light conductors 12, which includes the elevated prism structures 22.

The prism structures 22' made by deepenings, as well as the prism structures 22 made by elevations, are arranged and aligned in such a way that a boundary surface realized by prism structures 22' made deepenings is positioned opposite of a boundary surface realized by elevated prism structures 22 in such a way that the light 38 which exits out of the boundary surface realized by prism structures 22' made by deepenings, and then traverses through the air gap between the two light conductors, impacts on the boundary surface realized by elevated prism structures 22 in such a steep angle (in a very small angle with regards to the surface normal) that light enters into the elevated prism structure 22 of the boundary surface of the first light conductor 12. The arrangement of the prism-shaped elevations 22 and deepenings 22' is preferably made in such a way that each prism structure 22' made by a deepening forms a pair with each prism structure 22 made by an elevation, whereby light which exits from the prism structure 22' made by a deepening enters into the prism structure 22 made by an elevation, so that the deepening 22' is coupled with the elevation 22 by this light, the deepening 22' is not coupled with any other elevation, and the elevation 22 is not coupled with any other deepening by such light. The location of the elevations 22 within the first light conductor 12 is thus defined by the position of the deepening 22' within the second light conductor 24, the light output direction of the light 38 that exits from the second light conductor 24, as well as the distance d between the first light conductor 12 and the second light conductor 24. The light thus couples via two oppositely arranged prism structures from the one light conductor into the other light conductor.

Deviating from the embodiment described above, where the elevations are not made as complementary negatives to the deepenings, these elevations can also be formed as such negatives of the deepenings. Independent from these embodiments, it is possible to allocate the second light conductor so close towards the first light conductor that the elevations reach into the deepenings. The arrangement allows for a coupling-out from the one light conductor and a coupling-in into the other light conductor. The distance can be minimal or also a few millimeters. A distance between the two light conductors 12 and 24 allows greater production tolerances and additional coupling-out prisms at the first light conductor in order to influence the light distribution.

It will be appreciated, on the basis of the reversibility of the light path, the first light conductor 12 can include prism structures made by deepenings and the second light conductor 24 can include prism structures made by elevations. Moreover, the cross-section of the light conductor 12 (in transverse direction with regards to the main direction of the light propagation), can be round and/or rectangular.

Figure 10:
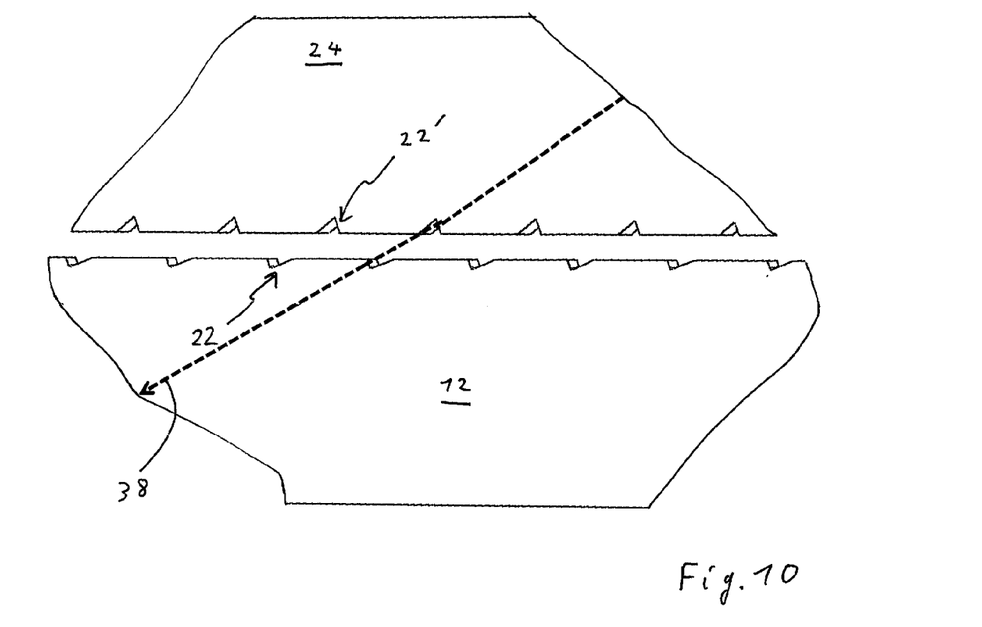
FIG. 10 shows an embodiment of a light conductor arrangement with prism structures that are only made of deepenings.

FIG. 10 shows a further embodiment of an arrangement made of a first light conductor 12 and of a second light conductor 24. The second light conductor 24 includes prism structures 22' made by deepenings within a boundary surface of the second light conductor. The first light conductor 12 includes prism structures 22 also made by deepenings within a boundary surface of a light conductor, in this case in the first light conductor 12.

The first light conductor 12 and the second light conductor 24 are hereby also arranged in such a way that the boundary surface of the second light conductor 24, which includes the prism structures 22' made by deepenings, is allocated opposite to the boundary surface of a first light conductor 12, which also includes prism structures 22 made by deepenings.

The prism structures 22 and 22', which in both cases are made by deepenings within a boundary surface, are arranged and aligned in such a way that one boundary surface of a prism structure 22' of the second light conductor 24 is located opposite to the second boundary surface of a prism structure 22 of the first light conductor in such a way that the light 38 which exits the boundary surface of prism structure 22' and which traverses through the air gap between the two light conductors and impacts on the boundary surface of prism structure 22 in such a steep angle (in a very small angle with regards to the surface normal), that this light enters into prism structure 22 of the boundary surface of the first light conductor 12. The allocation of the prism-shaped deepenings 22 and 22' is preferably arranged in such a way that one prism structure 22' made by a deepening, forms a pair with one prism structure 22 also made by a deepening, whereby light that exits the prism structure 22' enters prism structure 22, so that deepening 22' is coupled with deepening 22 by this light, and the deepening 22' is not coupled with any other deepening within the boundary surface of the first light conductor 12 and that deepening 22 is not coupled with any other deepening within the boundary surface of the second light conductor 24 by such light. The location of the deepenings 22 within the first light conductor 12 is thus defined by position of the deepening 22' within the second light conductor 24, the light output direction of the light 38 that exits from the second light conductor 24, as well as the distance d between the first light conductor 12 and the second light conductor 24. Here as well, the light couples via two oppositely arranged prism structures from the one light conductor into the other light conductor.

In this case it is important that the arrangement allows for a coupling-out from the one light conductor and a coupling-in into the other light conductor. The distance can be minimal, or also a few millimeters. A distance between the two light conductors 12 and 24 allows greater production tolerances and additional coupling-out prisms at the first light conductor in order to influence the light distribution. In this case, the cross-section of the light conductor 12 and/or 24 (in transverse direction with regards to the main direction of the light propagation), can also be round and/or rectangular.

Figure 11:
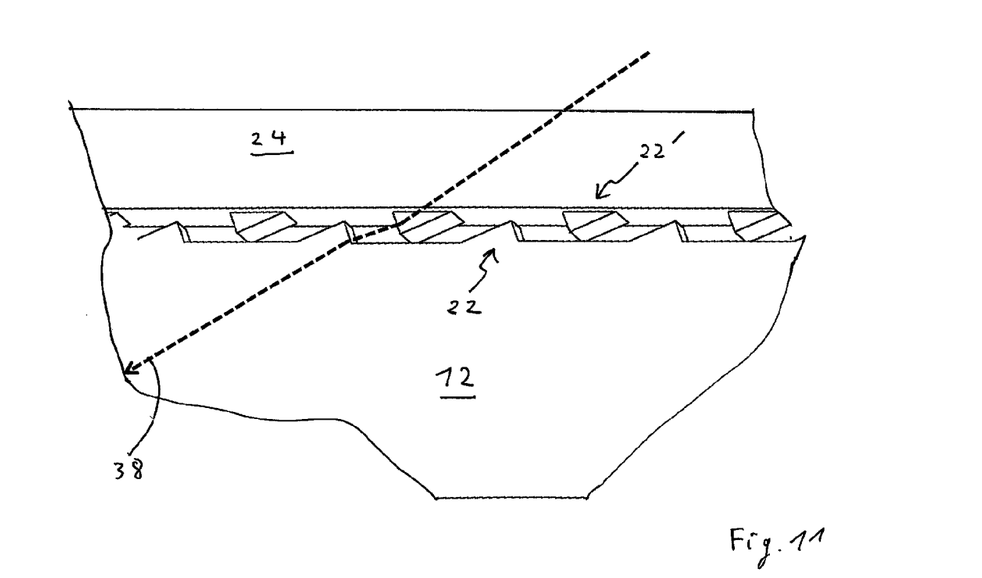
FIG. 11 shows an embodiment of a light conductor arrangement with prism structures that are only made of elevations.

FIG. 11 shows a further embodiment of an arrangement made of a first light conductor 12 and of a second light conductor 24. The second light conductor 24 includes prism structures 22' made by elevations within the boundary surface of the second light conductor. The first light conductor 12 includes prism structures 22 also made by elevations within the boundary surface of a light conductor, in this case of the first light conductor 12.

The first light conductor 12 and the second light conductor 24 are also aligned in such a way that the boundary surface of the second light conductor 24, which includes prism structures 22' made by elevations, is allocated opposite to the boundary surface of the first light conductor 12, which also includes prism structures 22 made by elevations.

The prism structures 22 and 22', which in both cases are made by elevations within a boundary surface, are arranged and aligned in such a way that one boundary surface of a prism structure 22' of the second light conductor 24 is located opposite to the second boundary surface of a prism structure 22 of the first light conductor, such that the light 38 which exits the boundary surface of prism structure 22' and which traverses through the air gap between the two light conductors and impacts on the boundary surface of prism structure 22 in such a steep angle (in a very small angle with regards to the surface normal), that this light enters into prism structure 22 of the boundary surface of the first light conductor 12. The allocation of the prism-shaped elevations 22 and 22' is preferably arranged in such a way that exactly one prism structure 22' made by an elevation forms a pair with one prism structure 22 also made by an elevation, whereby light that exits the prism structure 22' enters the prism structure 22 so that the elevation 22' is coupled with the elevation 22 by this light, and the elevation 22' is not coupled with any other elevation within the boundary surface of the first light conductor 12, and the elevation 22 is not coupled with any other elevation within the boundary surface of the second light conductor 24 by such light. The location of the elevations 22 within the first light conductor 12 is thus defined by the position of the elevations 22' within the second light conductor 24, the light output direction of the light 38 that exits from the second light conductor 24, as well as the distance d between the first light conductor 12 and the second light conductor 24. Here as well, the light thus couples via two oppositely arranged prism structures from the one light conductor into the other light conductor.

In this case too, the arrangement allows for a coupling-out from the one light conductor and a coupling-in into the other light conductor. The distance can be minimal or also a few millimeters. A distance between the two light conductors 12 and 24 allows greater production tolerances and additional coupling-out prisms at the first light conductor in order to influence the light distribution. In this case, the cross-section of the light conductor 12 and/or 24 (in transverse direction with regards to the main direction of the light propagation), can also be round and/or rectangular.

Concerning all embodiments of the present invention that include light conductor cross-sections realized as a circle or an ellipsis, side borders in straight shapes may also be used. Moreover, it is also possible that these geometrical shapes could combined, such as in the case of a rectangle with round edges, as a basic geometry of the light conductor.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A lighting device in a motor vehicle comprising:
a first light conductor for propagating light along a longitudinal extension of the first light conductor by total internal reflection along a longitudinal extension of the first light conductor, wherein the first light conductor is substantially rod-shaped and includes a light input area at least on one end face, whereby the longitudinal extension of the first light conductor is greater than a transverse width of the first light conductor, and wherein the first light conductor includes a light coupling-out area that extends over a section of the longitudinal extension and which includes a prism structure which reflects incident light onto a light output area of the first light conductor disposed substantially opposite of the light coupling-out area,
at least one second light conductor for propagating light along a longitudinal extension of the at least one second light conductor by total internal reflection, wherein the at least one second light conductor includes a light input area at one end face and whereby the at least one second light conductor features a light output area including a prism structure through which at least part of the light directly exits the at least one second light conductor, whereby the at least one second light conductor and the first light conductor are arranged with respect to each other such that light exiting the at least one second light conductor enters into the first light conductor via a midway coupling-in through the light coupling-out area of the first light conductor, and wherein an air gap is formed between the prism structure of the light output area of the at least one second light conductor and the prism structure of the light coupling-out area of the first light conductor and the light coupled into the first light conductor from the at least one second light conductor propagates within the first light conductor along at least part of its longitudinal extension by total internal reflection.

2. The lighting device as set forth in claim 1, wherein the light output area of the at least one second light conductor includes a prism structure complementary to a prism structure of the light coupling-out area of the first light conductor.

3. The lighting device as set forth in claim 1, wherein the prism structure of the light coupling-out area of the first light conductor is formed in a triangular saw-tooth shape within a longitudinal section of the first light conductor extending in longitudinal direction.

4. The lighting device as set forth in claim 1, wherein the first light conductor has a plurality of rows of prisms at the coupling-out area arranged parallel towards each other in longitudinal extension of the first light conductor, whereby the rows of prisms each run in transverse direction to the longitudinal extension of the first light conductor.

5. The lighting device as set forth in claim 4, wherein the individual rows of prisms have different prism structures.

6. The lighting device as set forth in claim 1, wherein the first light conductor is designed in a curved shape.

7. The lighting device as set forth in claim 6, wherein the design of the first light conductor forms a ring-shape.

8. The lighting device as set forth in claim 7, wherein the first light conductor is designed as a closed ring.

9. The lighting device as set forth in claim 1, wherein the at least one second light conductor is designed in a curved shape.

10. The lighting device as set forth in claim 1, wherein at least one respective light source is assigned to the light input area of the first light conductor and to a light input area of the second light conductor, wherein the light sources emit light in a different respective color.

11. The lighting device as set forth in claim 1, wherein at least two respective light sources are assigned to the light input area on the end face of the first light conductor and to a light input area on an end face of the at least one second light conductor, wherein the light sources emit light in a different respective color.

12. The lighting device as set forth in claim 1, including a plurality of second light conductors, whereby light output areas of the second light conductors are arranged in succession along the longitudinal extension of the first light conductor.

13. The lighting device as set forth in claim 1, wherein a cross-sectional area across the longitudinal extension of the at least one second light conductor reduces with respect to increased distance to the light input area in a region adjacent the light output area.

14. The lighting device as set forth in claim 1, wherein the lighting device is configured to produce at least one light function.

15. The lighting device as set forth in claim 11, wherein the lighting device is configured to produce at least two different light functions.

* * * * *